United States Patent [19]
Yamada et al.

[11] Patent Number: 5,258,847
[45] Date of Patent: Nov. 2, 1993

[54] OBJECT TRACING DEVICE

[75] Inventors: Kunihiko Yamada, Tokyo; Akihiro Fujiwara, Kanagawa; Hirofumi Suda, Kanagawa; Masamichi Toyama, Kanagawa; Masahide Hirasawa, Kanagawa; Kitahiro Kaneda, Kanagawa, all of Japan

[73] Assignee: Canon Kabushiki Kaisha, Tokyo, Japan

[21] Appl. No.: 896,727

[22] Filed: Jun. 9, 1992

Related U.S. Application Data

[63] Continuation of Ser. No. 784,723, Oct. 28, 1991, abandoned, which is a continuation of Ser. No. 625,954, Dec. 11, 1990, abandoned, which is a continuation of Ser. No. 495,322, Mar. 19, 1990, abandoned.

[30] Foreign Application Priority Data

Mar. 22, 1989 [JP] Japan .................................. 1-70952

[51] Int. Cl.⁵ ............................................ H04N 5/232
[52] U.S. Cl. .................................. 358/227; 358/335; 358/906
[58] Field of Search ............... 358/125, 126, 227, 906, 358/335

[56] References Cited

U.S. PATENT DOCUMENTS 3,435,136 3/1969 Bachmann ........................... 358/227
4,614,975 9/1986 Kaite ..................................... 358/227
4,872,058 10/1989 Baba ..................................... 358/227

Primary Examiner—Howard W. Britton
Attorney, Agent, or Firm—Robin, Blecker, Daley & Driscoll

[57] ABSTRACT

An object tracing device comprises an area setting circuit which sets a detection area on an image sensing plane for detection of information about an object image formed on the image sensing plane; an object tracing circuit arranged to detect any change occurring in the position of the object image on the image sensing plane and to cause the set position of the detection area to change while following the object image; a recording instruction circuit for giving a recording start instruction to a recording circuit which is arranged to record image information including the object image obtained on the image sensing plane; and a control circuit which causes the object tracing circuit to begin to act in response to the instructing action of the recording instruction circuit.

37 Claims, 3 Drawing Sheets

OBJECT TRACING DEVICE

This is a continuation application under 37 CFR 1.62 of prior application Ser. No. 784,723, filed Oct. 28, 1991 which is continuation application under 37 CRF 1.62 of prior application Ser. No. 625,954, filed Dec. 11, 1990, now abandoned which is a continuation of Ser. No. 495,322 filed Mar. 19, 1990 (now abandoned).

BACKGROUND OF THE INVENTION

1. Field of the Invention

This invention relates to an object tracing device highly suited for a video recorder or the like.

2. Description of the Related Art

The video apparatuses such as a video camera, a camera-integrated video recorder, etc., have remarkably advanced during the recent years. Efforts to automate the focusing (AF), exposure adjusting (AE) and gain adjusting (AGC) devices, etc., are being advanced. Of these devices, the use of the automatic focusing device especially for the video apparatuses of the above-stated kind is rapidly becoming popular even in the field of consumer appliances.

There are various automatic focusing methods. The well-known methods include a so-called active type automatic focusing method wherein an object to be photographed is illuminated with infrared rays or the like and an in-focus point is detected on the principle of the trigonometric measurement by using a reflected light thus obtained from the object; and a so-called passive method wherein a high-frequency component is extracted from a video signal and the lens is driven to shift its position in the direction in which the amount of the high-frequency component increases. The latter method has of late come to be preferably employed, because: it permits detection of a focusing state through a video signal obtained from image sensing means without using any elements for illuminating and receiving infrared rays. Besides, no faulty action results from, for example, a distance to the object or from shooting through glass. The applicability of this method is thus unrestricted by photographing conditions.

With the passive method employed, the focusing action can be accomplished on the basis of the high-frequency component of a video signal which corresponds to the whole image sensing plane of the image sensing means. If the whole image sensing plane is to be used as a focus detecting area, a so-called perspective contention tends to arise between a main object and a background. To avoid this, therefore, a focus detecting area is set only within a part of the image sensing plane which is, for example, located in the central part of the image sensing plane.

The arrangement to set such a limited area, in the central part of the image sensing plane is not only advantageous for the AF action but also enables the AE and AGC actions to be adequately performed by adjusting an exposure or a signal gain with weight attached to the signal obtained from within the area thus set without being affected by the luminance of the background under a so-called back-light condition or the like.

However, the above-stated advantageous effect is attainable only when a main picture-taking object is located in the central part of the image sensing plane where the focus detecting area is set. In cases where the main object moves outside of the focus detecting area, the AF, AE and AGC actions are faultily performed as these action are likely to be performed for some other object instead of the main object.

An automatic tracing device has been proposed as a solution of this problem, for example, in Japanese Laid-Open Patent Application No. SHO 60-249477. The automatic tracing device is arranged as follows: the high-frequency component of a spatial frequency is detectable in a greater quantity from the main object part than the other part. In view of this, the focus detecting area is set always in a position where the amount of the high-frequency component of the video signal reaches a peak value within the image sensing plane. This arrangement of the device enables the focus detecting area to follow the movement of the main object. Therefore, the lens can be continuously focused on the object despite of any movement of the object that takes place within the image sensing plane. The same advantageous effect is attainable also for the AE and AGC actions.

In the above-stated prior art device, however, the position in which the high-frequency component of the video signal reaches a maximum value is regarded as a feature point of the main object. Therefore, if the maximum value of the high-frequency component corresponding to some other object, such as a background object, is detected by mistake, the device thereafter would continue to have the lens focused on the mistaken object. The device thus rather causes inconvenience.

Another device has been proposed by Japanese Laid-Open Patent Application No. SHO 60-249477. This device is arranged as follows: the focus detecting area is set in the central part of the image sensing plane when the peak value of the high-frequency component drops below a given level and an object tracing action is resumed when the peak value comes to exceed the given level. In accordance with this arrangement, however, when the lens comes from an out-of-focus state to an in-focus state, the object must be located in the central part of the image sensing plane. If not, the camera must be moved and set by the photographer to have the object in the central part of the image sensing plane, even while the lens is still in an out-of-focus state, before the lens is brought into the in-focus state. The photographer is thus required to perform an additional step of operation during the process of photographing. This is not only burdensome but also tends to cause a faulty action.

SUMMARY OF THE INVENTION

It is a first object of this invention to solve the above-stated problems of the prior art.

It is a second object of the invention to provide an image sensing device which excels in operability and yet is capable of automatically tracing a main photographing object.

It is a third object of the invention to provide an automatic object tracing device which prevents a faulty action at the beginning of picture-taking.

It is a fourth object of the invention to provide an image sensing device which is capable of causing a focus detecting area to accurately trace a picture-taking object without necessitating the photographer to take the trouble of changing the camera direction to have the object in the central part of an image sensing plane even while the lens of the camera is still in an out-of-focus state.

To attain this object, a preferred embodiment of this invention comprise means for setting a detection area within an image sensing plane for detecting information on the image of a photo-taking object formed on the image sensing plane; object tracing means arranged to detect any displacement of the object image occurring within the image sensing plane and to change the position of the detection area while following the object image; recording instruction means for instructing recording means to begin to record image information including the object image obtained on the image sensing plane; and control means for causing the object tracing means to begin to act in response to the instructing action of the recording instruction means.

It is a fifth object of the invention to provide a video camera system which has an automatic tracing function for automatically tracing a picture-taking object within an image sensing plane and is capable of capturing the object always within an object tracing detection area at the beginning of a picture-taking operation.

It is a sixth object of the invention to provide an object tracing device which is arranged to change the set position of a detection area within an image sensing plane while following any movement of a main picture-taking object occurring on the image sensing plane and to begin the object following action thereof in response to a recording action of recording means. The arrangement effectively prevents such a faulty action as to shift the detection area while following a wrong object instead of the main object at the time of commencement of the recording action. The device arranged in this manner has good and reliable operability.

The above and other objects and features of the invention will become apparent from the following detailed description of an embodiment thereof taken in connection with the accompanying drawings:

DETAILED DESCRIPTION OF THE PREFERRED EMBODIMENT

An object tracing device which is arranged according to this invention is described below with reference to the accompanying drawings. In this case, the invention is applied to the automatic focusing device of a camera-integrated video recorder.

Figure 1:
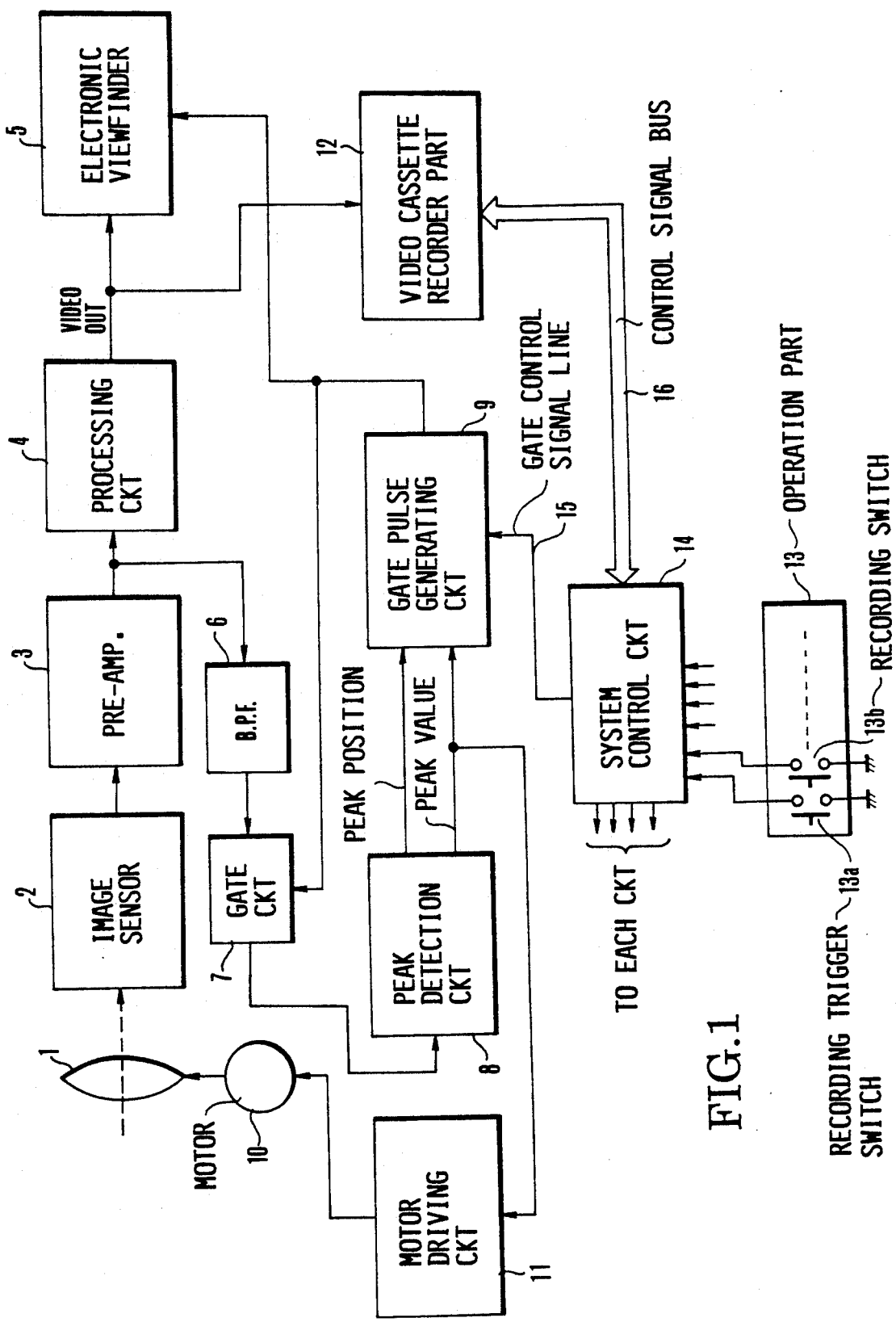
FIG. 1 is a block diagram showing the arrangement of an object tracing device arranged according to this invention.

FIG. 1 shows in a block diagram the camera-integrated video recorder to which this invention is applied. In FIG. 1, a reference numeral 1 denotes a photo-taking lens. An image sensor 2 which is a CCD or the like is arranged to photoelectrically convert information on an image formed on the image sensing plane thereof by the photo-taking lens 1 and to produce a video signal obtained as a result of the conversion. A pre-amplifier 3 is arranged to amplify the signal output from the image sensor 2 up to a given level. A processing circuit 4 is arranged to process the video signal amplified by the pre-amplifier 3, including a gamma correction process, a blanking process, a synchronizing signal adding process, etc., and to convert the signal into the form of a TV signal conforming to, for example, the NTSC system. An electronic viewfinder 5 is arranged to permit monitoring the TV signal output from the processing circuit 4.

Figure 3:
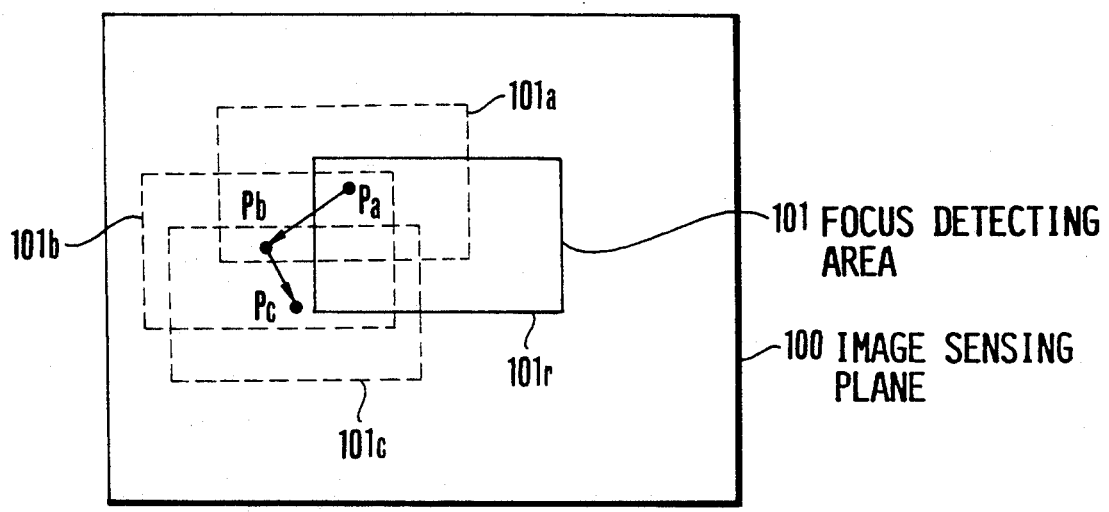
FIG. 3 shows the movement of an object tracing detection area taking place with an image sensing plane.

A band-pass (or high-pass) filter 6 is arranged to extract the high-frequency component of a luminance signal included in the video signal output from the pre-amplifier 3. A gate circuit 7 is arranged to set a focus detecting area (or a so-called distance measuring frame) for detecting a focusing state obtained within a specific part of the image sensing plane of the image sensor and to transmit only a video signal part that corresponds to a focus detecting area defined by performing a gating action on the input video signal. FIG. 3 shows a relation obtained between the image sensing plane and the focus detecting area. As shown, the focus detecting area 101 is set within the image sensing plane 100 by means of the gate circuit 7. A part of the video signal corresponding to the inside of this area is alone allowed to pass by the gate circuit 7. The opening and closing action of the gate circuit 7 is controlled by a gate pulse generating circuit 9 in such a way as to allow the signal to pass only for a period of the video signal part corresponding to the position of the focus detecting area set on the image sensing plane. A peak detection circuit 8 is arranged to detect the peak value of the high-frequency component of the video signal which corresponds to the focus detecting area and obtained for every given period (one field period, for example) and also to detect the peak-detected position of the high-frequency component on the image sensing plane. The peak detection circuit 8 consists of, for example, a peak holding circuit, a counter which operates in synchronism with a synchronizing (hereinafter referred to as sync) signal included in the video signal and a memory which stores the counted value of the counter. The counted value of the counter is stored every time the peak value changes and is output as information on the peak-detected position on the image sensing plane. The gate pulse generating circuit 9 is arranged to supply the gate circuit 7 with a gate pulse signal for setting the position of the focus detecting area on the image sensing plane on the basis of information on the peak value and the peak-detected position in such a way as to have the peak-detected position in the central part of the focus detecting area of the image sensing plane. More specifically, a video signal line is opened and closed under the control of the gate pulse signal in such a way as to allow only a video signal part that corresponds to the focus detecting area of the image sensing plane according to the sync signal. The gate pulse signal is supplied also to the electronic viewfinder 5 to have the focus detecting area displayed on a monitor screen.

Such being the arrangement, the focus detecting area is always set in such a way as to have the peak value of the high-frequency component at the center of its spread on the image sensing plane (see FIG. 3).

The control over the position of the focus detecting area is based on the following concept: on the image sensing plane, the amount of the high-frequency component of spatial frequency increases at an in-focus part of the image such as a main object image and decreases at such a part as the background of the picture. Hence, the peak-detected position of the high-frequency component can be considered to correspond to the center of the object image. Therefore, when the object image moves, the focus detecting area follows it while moving within the image sensing plane to keep the object image within the focus detecting area.

A motor 10 is provided for focus adjustment by driving the photo-taking lens 1. A motor driving circuit 11 is arranged to drive and control the motor 10 according to the peak value information output from the peak detection circuit 8 in such a way as to cause the position of the photo-taking lens 1 to be shifted in the direction in which the peak value increases. Therefore, the instant the focus detecting area is set, the focus adjusting action is performed to increase the peak value in a cycle of control, that is, the field period.

A video cassette recorder part 12 is arranged to record the video signal output from the processing circuit 4 on a recording medium such as a magnetic tape which is not shown. There is provided an operation part 13 for giving various control instructions to the video cassette recorder part 12, such as an instruction for selection of an operation mode, etc. The operation part 13 includes among others a recording trigger switch 13a for instructing the recorder part 12 to start a recording action, and a recording switch 13b for setting a recording mode (a recording stand-by state). Other operation switches that are not directly related to this invention are omitted from illustration. A system control circuit 14 is arranged to perform control over the whole system consisting of the camera part and the video cassette recorder part. A gate control signal line 15 is arranged to apply a control signal to the gate pulse generating circuit 9 for rendering it operative or inoperative and for controlling an action of resetting the focus detecting area in the initial position thereof (in the central part of the image sensing plane, etc.). There is provided a control signal bus 16 for supplying an operation mode instruction signal to the video cassette recorder part 12 and for receiving a detection signal indicating an operating state from the video cassette recorder part 12.

Figure 2:
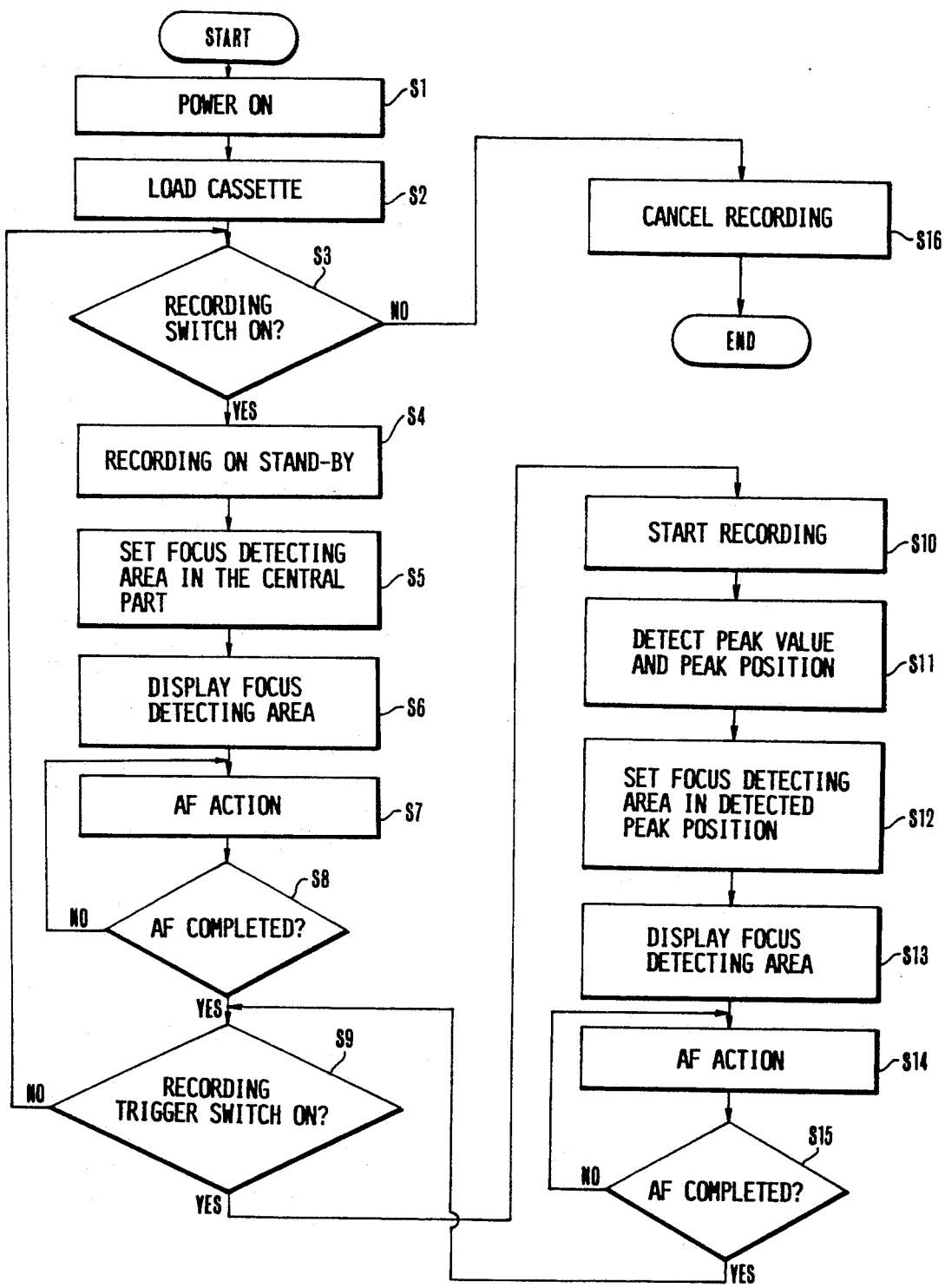
FIG. 2 is a flow chart showing the control operation of the device arranged according to this invention.

The image sensing apparatus which is arranged according to this invention as described above functions and operates in a manner as will be described below with reference to FIG. 2 which is a flow chart showing a control operation:

Referring to FIG. 2, a power supply is switched on for a picture taking operation at a step S1. Step S2: The system is loaded with a magnetic tape which is used as a recording medium. Step S3: The recording switch 13b is operated at the operation part 13. Step S4: Then, the system control circuit 14 sets the video cassette recorder part 12 in a recording stand-by mode. Step S5: The gate circuit 7 for the focus detecting area is set in a gate position corresponding to the initial position 101r of the focus detecting area as shown in FIG. 3. Step S6: At the same time, the position of the focus detecting area thus set is displayed within the electronic viewfinder 5.

Steps S7 and S8: Under this condition, the motor driving circuit 11 drives the motor 10 on the basis of an output of the peak detection circuit 8 to shift the position of the photo-taking lens 1 to an in-focus point. The focus adjusting action is thus performed.

Step S9: The recording trigger switch 13a is operated by the photographer. Step S10: In response to this, the system control circuit 14 controls the video cassette recorder part 12 via the control signal bus 16. A recording action begins. Step S11: At the same time, the system control circuit 14 controls the gate pulse generating circuit 9 through the gate control signal line 15. Then, as described in the foregoing, an automatic object tracing action begins to set the focus detecting area at a part within the image sensing plane where the peak value of the high-frequency component of the video signal is detected. When the object tracing action begins, the peak detection circuit 8 stores the peak value of the high-frequency component of the video signal obtained within the focus detecting area on the image sensing plane and also information on the position within the image sensing plane at which the peak value is detected. Step S12: Following the step S11, the gate pulse generating circuit 9 produces the gate pulse signal to cause the gate circuit 7 to set the focus detecting area in a place where a peak-detected position which is found at the step S10 is located at the center of the spread of the focus detecting area. In other words, the focus detecting area is shifted, following the movement of a picture-taking object, to a position where the object can be best captured. In FIG. 3, areas 101a, 101b and 101c indicate the manner in which the focus detecting area 101 changes according to changes in the peak-detected position Pa, Pb or Pc.

This arrangement enables the object tracing device to shift the focus detecting area while following the object so that the lens can be focused continuously on the object even when the position of the object changes on the image sensing plane. Further, even during the process of the object tracing action, the gate pulse signal output from the gate pulse generating circuit 9 is supplied also to the viewfinder 5. Step S13: This enables the viewfinder 5 to display the position of the focus detecting area on the monitor screen.

Steps S14 and S15: The motor driving circuit 11 compares the peak value currently detected from the focus detecting area and output from the peak detection circuit 8 with a peak value previously detected. The circuit 11 then causes the motor 10 to drive the photo-taking lens 1 in the direction in which the peak value increases. The focus of the lens 1 on the object is thus adjusted. After the step S15, the flow of operation comes back to the step S9. At the step S9: A check is made for the position of the recording trigger switch 13a. Then, the above-stated object tracing action on the focus detecting area and the automatic focus adjusting action are performed in parallel in a given cycle (field period) so long as the switch 13a is in operation.

If the recording trigger switch 13a is found to have been released from its operating state at the step S9, the flow comes back to the step S3. At the step S3: The system control circuit 14 brings the video cassette recorder part 12 back to the recording stand-by state by using the control signal bus 16. After that, the focus detecting area is shifted back to and fixed in the central part of the image sensing plane by using the gate control signal line 15. Then, the control circuit 14 waits for the next operation on the recording trigger switch 13a while performing the automatic focusing action.

In a case where the recording switch 13b is found to have been released from its operating state, the flow branches to a step S16. Step S16: The recording stand-by mode is canceled and the control flow comes to an end.

The operation of the embodiment of this invention is as described above. In recording, the photographer normally sets the video camera in a recording stand-by state; then, looks into the viewfinder; directs the video camera to a photo-taking object; sets a camera angle to have the object in the central part of the image sensing plane for adjustment of the focus of the lens; and, after that, starts recording by operating the recording trigger switch. This is a natural way of operating the video camera.

In view of this, the video camera according to this invention is arranged to have the lens focused on the object by keeping the focus detecting area in the central part of the image sensing plane until the recording action begins after the recording trigger switch is operated. The automatic object tracing action is allowed to begin concurrently with the start of recording by finding the detected position of the peak value of the high-frequency component included in the video signal representing the object and by shifting the focus detecting area accordingly.

This enables the photographer to shoot in an in-focus state with the focus detecting area kept following one and the same object within a scene until the recording trigger switch 13a is turned off to bring the system into the recording stand-by state. In other words, taking the picture of an object within a scene continues without changing the object to another object in most cases. During this period, the lens position seldom comes out of focus to such an excessive degree that necessitates the focus detecting area to be reset in the central part of the image sensing plane by bringing the object tracing action to a stop.

Further, the camera-integrated video camera is required to record images with focus adjustment, exposure control and gain control automatically carried out with a high degree of accuracy. However, these control actions are not important in a stand-by mode in which no image is recorded. Therefore, the arrangement to have the focus detecting area fixed in the central part of the image sensing plane during the period of the recording stand-by mode brings about no problem.

In the case of the embodiment described, the peak value of the high-frequency component included in the video signal representing an image is detected; and the object tracing action is performed by shifting the focus detecting area on the basis of the position where the peak value is detected within the image sensing plane. However, the invention is not limited to the use of the peak value of the high-frequency component for this purpose. The arrangement may be changed to use the peak value of a differential value of the video signal representing the object in place of the above-stated peak value of the high-frequency component. A difference between the luminance level of the object and that of the background obtained from the video signal is also usable for the same purpose.

Further, the embodiment described is arranged to use one and the same area both for detecting the focus and for tracing the object. However, this arrangement may be changed to set an object tracing area separately from the focus detecting area and to adjust the latter to the former.

In the foregoing description of the embodiment, the object tracing arrangement is applied to the position control over the focus detecting area. However, the object tracing arrangement is applicable in exactly the same manner also to the detection area of an automatic exposure control (AE) device or that of an automatic gain control (AGC) device.

As described in the foregoing, the object tracing device according to this invention is arranged to allow the object tracing means which shifts the detection area setting position while following the movement of the object taking place within the image sensing plane to begin to act in response to the start of the recording action of the recording means. This effectively prevents such a faulty action as to let the detection area follow a wrong object instead of the main object desired at the beginning of the recording action. Therefore, the object tracing device according to this invention has good and reliable operability.

What is claimed is:

1. An image sensing apparatus comprising:
   a) image sensing means for photo electrically converting into an electrical signal an object image formed on an image sensing plane;
   b) area setting means for setting a detection area on the image sensing plane;
   c) object tracing means arranged to detect any displacement of the object image taking place within the image sensing plane and to shift a set position of said detection area within the image sensing plane while following the displacement of the object image;
   d) recording means for recording on a recording medium an image signal output from said image sensing means;
   e) recording instruction means for instructing said recording means to start a recording action; and
   f) control means for causing, in response to recording instructions of said recording instruction means, said object tracing means to start an object tracing action thereof.

2. An apparatus according to claim 1, wherein said object tracing means is arranged to extract, as a feature point of the object image, a peak position of a high-frequency component of the image signal obtained from within said detection area and to shift said detection area while following the displacement of said peak position.

3. An apparatus according to claim 2, wherein said detection area is used also as a focus detecting area for focus detection, and further comprising focus detecting means arranged to detect a focusing state of the object image within said detection area.

4. An apparatus according to claim 3, wherein said focus detecting means is arranged to drive a focusing lens which varies the focusing state of the object image formed on the image sensing plane, in such a way as to cause the peak value of the high-frequency component obtained from within said detection area to reach a maximum value.

5. An apparatus according to claim 1, wherein said recording means is a video cassette recorder.

6. An apparatus according to claim 1 or 5, wherein said recording instruction means includes a recording trigger switch arranged to cause a recording action to start.

7. An apparatus according to claim 6, wherein said object tracing means is arranged to fixedly keep said detection area at an initial position which is approximately in the central part of the image sensing plane before said recording instructions are issued.

8. A recording apparatus comprising:
   a) image sensing means for photoelectrically converting into an electrical signal an object image formed on an image sensing plane;
   b) area setting means for movably setting a focus detecting area within the image sensing plane;
   c) recording means for recording on a recording medium an image signal output from said image sensing means; and d) control means for causing said focus detecting area set by said area setting means to become movable within the image sensing plane in response to a commencement of a recording action of said recording means.

9. An apparatus according to claim 8, further comprising tracing means for moving said focus detecting area while following any movement of the object image within the image sensing plane.

10. An apparatus according to claim 9, wherein said tracing means is arranged to extract, as a feature point of the object image, a peak position of a high-frequency component of the image signal obtained from within said focus detecting area and to move said focus detecting area while following the displacement of said peak position.

11. An apparatus according to claim 8, wherein said recording means includes a recording trigger switch arranged to cause a recording action to start.

12. An apparatus according to claim 8, wherein said control means is arranged to cause said focus detecting area to be fixed at an initial position which is approximately in the central part of the image sensing plane before commencement of the recording action.

13. An apparatus according to claim 12, further comprising display means for displaying said focus detecting area on a monitor screen in a superimposed state.

14. An image sensing apparatus comprising:
   a) an optical system for forming an object image on an image sensing plane of image sensing means;
   b) area setting means for movably setting a detection area on the image sensing plane;
   c) first control means for controlling said optical system by using a signal component of a signal output from said image sensing means corresponding to the inside of said detection area;
   d) recording means for recording the signal output from said image sensing means; and
   e) second control means for rendering said detection area movable within the image sensing plane in response to a commencement of recording by said recording means.

15. An apparatus according to claim 14, wherein said detection area is a focus detecting area, and wherein said first control means is arranged to detect a focusing state of the object image on the basis of a given component of an image signal corresponding to the inside of said focus detecting area and to adjust focus of said optical system according to the result of detection.

16. An apparatus according to claim 15, wherein said first control means is arranged to drive a focusing lens which varies the focusing state of the object image on the image sensing plane, in such a way as to cause a peak value of a high-frequency component of the signal which corresponds to the inside of said detecting area to reach a maximum value.

17. An apparatus according to claim 14, further comprising object tracing means arranged to extract a feature point of the object image obtained within said detection area and to shift said detection area while following any change that takes place in the position of said feature point.

18. An apparatus according to claim 17, wherein said feature point of the object image is a peak position of a high-frequency component of the signal which corresponds to the inside of said detection area.

19. An apparatus according to claim 14, wherein said recording means is a video cassette recorder.

20. An apparatus according to claim 14 or 19, wherein said recording means includes a recording trigger switch arranged to cause a recording action to start.

21. An apparatus according to claim 20, wherein said second control means is arranged to cause said detection area to be fixed at an initial position which is approximately in the central part of the image sensing plane before commencement of recording.

22. An image processing apparatus, comprising:
   a) area setting means for setting a detecting area in a screen so that a set position of said detecting area is changeable;
   b) recording means for recording an image in said screen; and
   c) control means for controlling said area setting means to inhibit an operation to change the set position of said detecting area in the case where said recording means is not operated.

23. An apparatus according to claim 22, wherein said control means holds the set position of said detecting area at a center of said screen in the case where said recording means is not operated.

24. An apparatus according to claim 22, further comprising;
   detecting means for detecting a change of the image in said screen, and wherein said area setting means changes the set position of said detecting area in said screen according to the change of the image.

25. An apparatus according to claim 24, wherein said detecting area in a focus detecting area.

26. An apparatus according to claim 22, wherein said screen is an image sensing plane of an image sensing device.

27. An apparatus according to claim 26, wherein said recording means is a video tape recorder which records an image signal output from said image sensing device.

28. A video camera apparatus, comprising:
   a) image sensing means for converting an image formed on an image sensing plane to an image signal;
   b) focusing means for setting a focus point at a position in said image sensing plane and changing said focus point in said image sensing plane according to a change of the image;
   c) recording means for recording the image signal on a recording medium; and
   d) holding means for holding said focus point at a center portion in said image sensing plane in the case where said recording means is not operated.

29. An apparatus according to claim 28, wherein said focusing means includes detecting means for detecting the moving of the image and tracing means for tracing the image according to a detection result of said detecting means.

30. A video camera apparatus, comprising:
   a) image sensing means for converting an image formed on an image sensing plane to an image signal;
   b) focusing means for setting a focus detecting area in said image sensing plane and changing said focus detecting area in said image sensing plane according to a change of the image;
   c) recording means for recording the image signal on a recording medium; and
   d) holding means for holding said focus detecting area at a center portion in said image sensing plane in the case where a recording mode in which said recording means is operable is not set.

31. An apparatus according to claim 30, wherein said focusing means includes object tracting means for detecting a movement of the image formed on the image sensing plane through the image signal and tracing the image according to the movement detected.

32. A video camera apparatus, comprising:
 a) image sensing means for converting an image formed on an image sensing plane to an image signal;
 b) detecting area setting means for movably setting a detecting area in said image sensing plane;
 c) detecting means for extracting a predetermined signal component of the image signal corresponding to an image in the detecting area and detecting a photographing condition on the basis of the predetermined signal component;
 d) recording means for recording the image signal on a recording medium; and
 e) control means for controlling said detecting area setting means to inhibit a moving operation of said detecting area in the case where said recording means is not operated.

33. An apparatus according to claim 32, wherein the predetermined signal component is a high frequency component of the image signal and said detecting means detects a focus condition of the image formed on said image sensing plane on the basis of the high frequency component.

34. An apparatus according to claim 32, wherein said detecting area setting means changes a position of said detecting area in said image sensing plane to trace a movement of said image.

35. An apparatus according to claim 34, wherein said recording means records the image signal on the tape-shaped recording medium.

36. A video camera apparatus, comprising:
 a) image sensing means for converting an image formed on an image sensing plane to an image signal;
 b) detecting area setting means for movably setting a detecting area in said image sensing plane;
 c) detecting means for extracting a predetermined signal component of the image signal corresponding to an image in the detecting area and detecting a photographing condition on the basis of the predetermined signal component;
 d) mode setting means for setting a plurality of modes including a recording mode; and
 e) control means for controlling said detecting area setting means according to said mode setting means to freeze a position of said detecting area in said image sensing plane when recording mode is released.

37. An apparatus according to claim 26, wherein the predetermined signal component is a high frequency component of the image signal and said detecting means detects a focus condition of the image formed on said image sensing plane on the basis of the high frequency component.

* * * * *

UNITED STATES PATENT AND TRADEMARK OFFICE
CERTIFICATE OF CORRECTION

PATENT NO. : 5,258,847
DATED : November 2, 1993
INVENTOR(S) : Kunihiko Yamada, et al.

It is certified that error appears in the above-indentified patent and that said Letters Patent is hereby corrected as shown below:

Col. 1, line 37. Delete ":"
Col. 2, line 4. Change "of" to -- to --

Col. 3, line 28. Change "to shift" to -- shifting --
Col. 8, line 9. Change "photo electrically" to -- photoelectrically --
Col. 10, line 32. Change "in" to -- is --
Col. 12, line 26. Change "26" to -- 36 --

Signed and Sealed this

Twenty-seventh Day of June, 1995

Attest:

BRUCE LEHMAN

Attesting Officer  Commissioner of Patents and Trademarks